United States Patent
Shibao

(10) Patent No.: US 7,502,492 B2
(45) Date of Patent: Mar. 10, 2009

(54) INTEGRATED CIRCUIT DEVICE AND MICROCOMPUTER

(75) Inventor: Kazuyuki Shibao, Soka (JP)

(73) Assignee: Seiko Epson Corporation (JP)

( * ) Notice: Subject to any disclaimer, the term of this patent is extended or adjusted under 35 U.S.C. 154(b) by 552 days.

(21) Appl. No.: 11/223,678

(22) Filed: Sep. 9, 2005

(65) Prior Publication Data

US 2006/0056656 A1    Mar. 16, 2006

(30) Foreign Application Priority Data

Sep. 10, 2004  (JP)  ............................. 2004-263248

(51) Int. Cl.
*G06K 9/00* (2006.01)
*H04N 7/18* (2006.01)

(52) U.S. Cl. ........................... 382/107; 382/291; 348/94
(58) Field of Classification Search ................ 382/100, 382/103, 107, 162, 165, 168, 173, 177, 181, 382/194, 203, 232, 255, 274, 276, 305, 318, 382/190, 221–224, 291; 348/223.1, 70, 211.13, 348/94, 135; 396/95
See application file for complete search history.

(56) References Cited

U.S. PATENT DOCUMENTS

| 5,023,646 | A | * | 6/1991 | Ishida et al. | ................... 396/95 |
| 5,032,913 | A | * | 7/1991 | Hattori et al. | .................. 348/70 |
| 6,621,927 | B1 | * | 9/2003 | Mori et al. | ................... 382/173 |
| 6,795,115 | B1 | * | 9/2004 | Okazaki | ................... 348/223.1 |

FOREIGN PATENT DOCUMENTS

| JP | 2000-196934 | * | 7/2000 |
| JP | 2001-69526 | * | 3/2001 |

* cited by examiner

*Primary Examiner*—Seyed Azarian
(74) *Attorney, Agent, or Firm*—Harness, Dickey & Pierce, P.L.C.

(57) ABSTRACT

An integrated circuit device having an image change detection circuit which receives image data acquired by imaging means in time series, detects a change in an image, and generates a change detection signal. The image change detection circuit includes: an integration circuit which divides an image into one or more areas, integrates pixel values of pixels of image data of a first image and a second image received in time series, in units of the areas, and stores the integrated values in an integration register; and a change detection signal generation circuit which compares the integrated values of corresponding areas of the first image and the second image stored in the integration registers to detect the presence or absence of change, and generates a change detection signal when the change detection signal generation circuit determines that a change has occurred.

15 Claims, 10 Drawing Sheets

INTEGRATION CYCLE OF 1/20 SEC

INTEGRATION CYCLE OF 1/60 SEC

INTEGRATED CIRCUIT DEVICE AND MICROCOMPUTER

Japanese Patent Application No. 2004-263248, filed on Sep. 10, 2004, is hereby incorporated by reference in its entirety.

BACKGROUND OF THE INVENTION

The present invention relates to an integrated circuit device and a microcomputer.

In a security camera system used in a security system, an image of a monitoring target location is obtained by using a security camera. A change between frames is detected by image processing, and an image is saved when a change has occurred at a certain level.

When it is desired to acquire an image only when a change has occurred in continuous images obtained by using a stationary camera or the like, it is necessary to detect occurrence of change using a CPU, a PC, an analog thermosensor, or the like.

When detecting occurrence of change using the CPU or PC, since the processing is performed after storing data in a frame buffer, the load imposed on the CPU and memory is increased. Moreover, power consumption is increased.

When using the analog thermosensor or the like, cost is increased due to incorporation of expensive parts.

Japanese Patent Application Laid-Open No. 2000-196934 and Japanese Patent Application Laid-Open No. 2001-69526 disclose related-art security camera technologies.

SUMMARY

According to a first aspect of the invention, there is provided an integrated circuit device having an image change detection circuit which receives pixel-unit image data acquired by imaging means in time series, detects a change in an image, and generates a change detection signal, wherein the image change detection circuit includes:

an integration circuit which divides an image into one or more areas, integrates pixel values of pixels of image data of a first image and a second image received in time series, in units of the areas, and stores the integrated values in an integration register; and a change detection signal generation circuit which compares the integrated values of corresponding areas of the first image and the second image stored in the integration registers to detect the presence or absence of change, and generates a change detection signal when the change detection signal generation circuit determines that a change has occurred.

According to a second aspect of the invention, there is provided a microcomputer comprising the above-described integrated circuit device.

DETAILED DESCRIPTION OF THE EMBODIMENT

Figure 1:
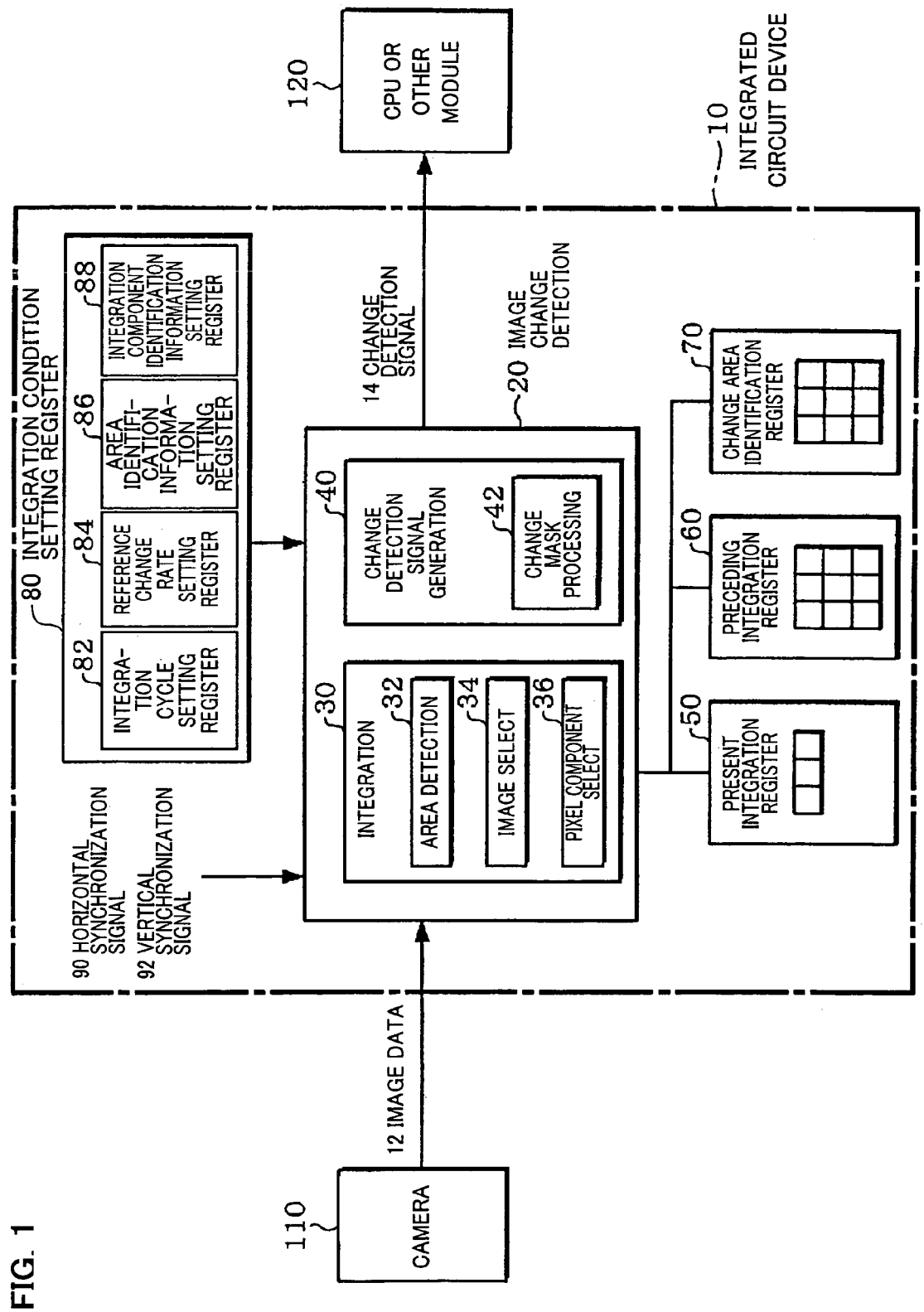
FIG. 1 is a block diagram of an integrated circuit device according to one embodiment of the invention.

The invention may provide an integrated circuit device and a microcomputer capable of detecting a change occurring in an image taken by imaging means at reduced cost and power consumption using a small storage capacity.

(1) According to one embodiment of the invention, there is provided an integrated circuit device having an image change detection circuit which receives pixel-unit image data acquired by imaging means in time series, detects a change in an image, and generates a change detection signal, wherein the image change detection circuit includes:

an integration circuit which divides an image into one or more areas, integrates pixel values of pixels of image data of a first image and a second image received in time series, in units of the areas, and stores the integrated values in an integration register; and a change detection signal generation circuit which compares the integrated values of corresponding areas of the first image and the second image stored in the integration registers to detect the presence or absence of change, and generates a change detection signal when the change detection signal generation circuit determines that a change has occurred.

The pixel value may be received in the YUV format, the RGB format, the YCbCr format, or another format (luminance and color difference), for example. The integration target may be the value of one component of the pixel value (e.g. luminance component or color difference component). The integration target may be predetermined higher-order bits of the value of one component.

The first image and the second image as the comparison targets are video images or the like taken by the imaging means such as a CCD camera and received in time series. The pixel values of all the received images may be integrated to detect the presence or absence of change, or the pixel values may be integrated in a predetermined integration cycle (e.g. at intervals of m frames (m is a natural number)) to detect the presence or absence of change.

A CPU or another module may be notified of the presence or absence of change by using the change detection signal as a change detection interrupt signal output to the CPU or another module, for example.

According to this embodiment, since the image change detection circuit can receive the image data from the imaging means in real time and detect a change, it suffices that the memory capacity and the memory load be small in comparison with the case where the image data is stored in a frame buffer and the CPU or a PC reads the image data from the frame buffer and performs the change detection processing. Moreover, power consumption can be reduced.

According to this embodiment, a change occurring in the image taken by the imaging means can be detected at reduced cost and power consumption using a small storage capacity.

(2) In this integrated circuit device, the integration circuit may divide an image into a plurality of areas, integrate pixel values of pixels of image data of the first image and the second image received in time series in units of the areas, and store the integrated values in the integration register; and the change detection signal generation circuit may compare the integrated values of corresponding areas of the first image and the second image stored in the integration register to detect the presence or absence of change, and generate the change detection signal when the change detection signal generation circuit determines that a change has occurred.

According to this embodiment, a change (e.g. change in contrast) can be detected in area units. Therefore, since the change moving direction can be determined by reading the areas in which a change has been detected in time series, simple movement detection can also be performed.

According to this embodiment, since a change can be detected in area units, it is also possible to deal with partial movement detection.

Moreover, the change detection sensitivity can be changed by changing the number of area divisions (changing the size of each area). For example, the change detection sensitivity can be increased by increasing the number of area divisions (reducing the size of each area).

(3) In this integrated circuit device, the image change detection circuit may include a change area identification register; and the change detection signal generation circuit may compare the integrated values of corresponding areas of the first image and the second image stored in the integration register to detect the presence or absence of change, and store evidence of the presence or absence of change in the change area identification register.

The change area identification register is a register for storing the results of detection of the presence or absence of change in area units, and may be configured so that the position of each bit is associated with each area and the presence or absence of change can be detected by an ON or OFF setting (value "1" or "0") of each bit.

This enables the CPU or another module to detect the area in which a change has occurred by referring to the change area identification register.

(4) In this integrated circuit device, the image change detection circuit may divide an image into a plurality of rectangular areas, and detect a change in units of the rectangular areas.

The identification processing of the area to which the pixel belongs and the change position detection are facilitated by dividing the image into the rectangular areas.

Since the sensitivity and the position detection accuracy are increased as the number of area divisions is increased, it is preferable to adjust the area division setting depending on the objective.

(5) In this integrated circuit device, the image change detection circuit may include an integration cycle setting register for setting a condition relating to an integration cycle; and the integration circuit may specify an integration cycle based on a value set in the integration cycle setting register, determine whether or not the received image data coincides with the specified integration cycle, integrate pixel values of the image data which coincides with the integration cycle, and store the integrated value in the integration register.

The value stored in the integration cycle setting register may be the integration cycle or a value which can specify the integration cycle (e.g. value which can be uniquely associated with a predetermined integration cycle).

According to this embodiment, it is possible to deal with detection of a quick or slow change by changing the value set in the integration cycle setting register.

(6) In this integrated circuit device, the image change detection circuit may include a reference change rate setting register for setting a condition relating to a reference change rate used as a reference when detecting a change; and the change detection signal generation circuit may specify the reference change rate based on a value set in the reference change rate setting register, compare integrated values of corresponding areas of the first image and the second image stored in the integration register, and detect the presence or absence of change based on the reference change rate.

According to this embodiment, the degree of change of the change target can be changed by changing the value set in the reference change rate setting register. The reference change rate may be expressed by the ratio of the amount of change with respect to the preceding integrated value, such as "(present integrated value−preceding integrated value)/preceding integrated value", for example. Since the change detection sensitivity is increased by decreasing the value of the reference change rate, it is preferable to adjust the area division setting depending on the objective.

The value stored in the reference change rate setting register may be the reference change rate or a value which can specify the reference change rate (e.g. value which can be uniquely associated with a predetermined reference change rate).

(7) In this integrated circuit device, the image change detection circuit may include an area identification information setting register for setting area identification information which is a condition for specifying a change detection target area; and the change detection signal generation circuit may determine whether or not an area is the detection target area based on a value set in the area identification information setting register, and omit generation of the change detection signal when the area is not the detection target area.

According to this embodiment, the CPU or the like can be notified of occurrence of change only when a change has occurred in the detection target area. There may be a case where it is unnecessary to detect a change occurring in a certain area depending on the imaging conditions since the image is always changed. According to this embodiment, since the change detection of such an area can be masked, it is possible to efficiently detect a change occurring in a particular area.

(8) In this integrated circuit device, the image change detection circuit may include an integration component identification information setting register for setting integration component identification information which is a condition for specifying an integration target component of the pixel value; and the integration circuit may select a pixel component based on a value set in the integration component identification information setting register, and integrate the selected pixel components of the image data.

Therefore, it is preferable to set a component optimum for change detection depending on the imaging conditions, the environment, and the imaging target.

The value stored in the integration component identification information setting register may be the integration component identification information or a value which can specify the integration component identification information (e.g. value which can be uniquely associated with predetermined integration component identification information).

(9) In this integrated circuit device, the integration circuit may receive a horizontal synchronization signal and a vertical synchronization signal, specify an area to which each pixel belongs based on the received horizontal and vertical synchronization signals, a number of horizontal divisions, and a number of vertical divisions, and integrate the pixel value of each pixel in the integration register corresponding to the specified area.

(10) In this integrated circuit device, the integration circuit may integrate values of high-order bits of the image data of each pixel value.

This reduces the hardware scale of the integration circuit and the integration register.

(11) In this integrated circuit device, the image change detection circuit may divide an image into n×m areas by dividing the image into m (m is a natural number) areas in a horizontal direction and dividing the image into n (n is a natural number) areas in a vertical direction, and include m×n present integration registers and m×n preceding integration registers corresponding to the m×n areas; and after the integration circuit has stored the integrated value of the image data of the second image received after the image data of the first image in the present integration register, the change detection signal generation circuit may compare the integrated value stored in the present integration register with the corresponding integrated value stored in the preceding integration register in which the integrated values of the image data of the first image is stored to detect the presence or absence of change, and transfer the integrated value stored in the present integration register to the preceding integration register after the comparison.

(12) In this integrated circuit device, the image change detection circuit may divide an image into n×m areas by dividing the image into m (m is a natural number) areas in a horizontal direction and dividing the image into n (n is a natural number) areas in a vertical direction, and include m present integration registers corresponding to the m areas in the horizontal direction and m×n preceding integration registers corresponding to the n×m areas; and after the integration circuit has stored the integrated values of the second image for the n areas in the horizontal direction received after the image data of the first image in the present integration registers, the change detection signal generation circuit may compare the integrated value stored in the present integration register with the corresponding integrated value stored in the preceding integration register in which the integrated values of the image data of the first image is stored to detect the presence or absence of change, and transfer the integrated value stored in the present integration register to the preceding integration register after the comparison.

This enables the number of second registers to be reduced to the number of divisions in the horizontal direction, whereby the hardware scale can be reduced.

(13) According to one embodiment of the invention, there is provided a microcomputer comprising the above-described integrated circuit device.

The embodiments of the invention will be described in detail below, with reference to the drawings. Note that the embodiments described below do not in any way limit the scope of the invention laid out in the claims herein. In addition, not all of the elements of the embodiments described below should be taken as essential requirements of the invention.

FIG. 1 is a block diagram of an integrated circuit device according to one embodiment of the invention.

An integrated circuit device 10 according to this embodiment includes an image change detection circuit 20 which receives pixel-unit image data 12 acquired by imaging means such as a camera 110 in time series, detects a change in the image, and generates a change detection signal 14.

The image change detection circuit 20 includes an integration circuit 30 which divides an image into one or more areas, integrates pixel values (or values relating to luminance) of pixels of image data of a first image and a second image received in time series in area units, and stores the integrated values in integration registers 50 and 60.

The image change detection circuit 20 includes a change detection signal generation circuit 40 which compares the integrated values of corresponding areas of the first image and the second image stored in the integration registers 50 and 60 to detect the presence or absence of change, and generates the change detection signal when the change detection signal generation circuit 40 determines that a change has occurred.

The image change detection circuit 20 includes the integration registers 50 and 60 which store the area-unit integrated values of the image data of the first image and the second image received in time series. For example, the area-unit integrated value of the pixel values of the first image data may be stored in the integration register 50, and the integrated value stored in the integration register 50 may then be transferred to the second integration register 60. Then, the area-unit integrated value of the image data of the second image received after the first image may be stored in the integration register 50, and the integrated values of corresponding areas of the first image and the second image stored in the integration registers 50 and 60 may be compared to detect the presence or absence of change.

The integration circuit 30 may divide an image into a plurality of areas, integrate the pixel values (or values relating to luminance) of the pixels of the image data of the first image and the second image received in time series in area units, and store the resulting integrated values in the integration registers 50 and 60. The change detection signal generation circuit 40 may compare the integrated values of corresponding areas of the first image and the second image stored in the integration registers 50 and 60 to detect the presence or absence of change, and generate the change detection signal 14 when the change detection signal generation circuit 40 determines that a change has occurred.

The image change detection circuit 20 may be configured to include a change area identification register 70. The change detection signal generation circuit 40 may compare the integrated values of corresponding areas of the first image and the second image stored in the integration registers 50 and 60 to detect the presence or absence of change, and store the evidence of the presence or absence of change in each area in the change area identification register 70.

The image change detection circuit 20 may be configured to include an integration cycle setting register 82 for setting an integration cycle. The integration circuit 30 may be configured to include an image select section 34 which specifies the integration cycle based on the value set in the integration cycle setting register 82 and determines whether or not the received image data 12 coincides with the specified integration cycle, to integrate the pixel values (or values relating to luminance) of the pixels of the image data 12 which coincides with the integration cycle in area units, and to store the integrated values in the integration registers 50 and 60.

The image change detection circuit 20 may include a reference change rate setting register 84 for setting a reference change rate used as a reference when detecting a change. The change detection signal generation circuit 40 may specify the reference change rate based on the value set in the reference change rate setting register 84, compare the integrated values of corresponding area of the first image and the second image stored in the integration registers 50 and 60, and detect the presence or absence of change based on the reference change rate.

The image change detection circuit 20 may include an area identification information setting register 86 for setting area identification information for specifying the change detection target area. The change detection signal generation circuit 40 may include a change mask processing section 42 which determines whether or not the area is the detection target area based on the value set in the area identification information setting register 86, and omits generation of the change detection signal when the area is not the detection target area.

The image change detection circuit 20 may include an integration component identification information setting register 88 for setting integration component identification information for specifying the integration target component of the pixel value. The integration circuit 30 may select the pixel component based on the value set in the integration component identification information setting register 88, and integrate the selected pixel components of the image data.

The integration circuit 30 may include an area detection section 32 which receives a horizontal synchronization signal 90 and a vertical synchronization signal 92 and determines the area to which each pixel belongs based on the received horizontal synchronization signal 90 and vertical synchronization signal 92 and the number of horizontal divisions and the number of vertical divisions.

An image may be divided into m areas in the horizontal direction and divided into n areas in the vertical direction to provide n×m divided areas. The image change detection circuit 20 may include the present integration register 50 for storing m×n integrated values and the preceding integration register 60 for storing m×n integrated values. After the integration circuit 30 has stored the integrated value of the image data of the second image in the present integration register 50, the change detection signal generation circuit 40 may compare the integrated value stored in the present integration register with the corresponding integrated value stored in the preceding integration register in which the integrated value of the image data of the first image is stored to detect the presence or absence of change, and transfer the integrated value stored in the present integration register to the preceding integration register after the comparison.

An image may be divided into "m" areas in the horizontal direction and divided into "n" areas in the vertical direction to provide n×m divided areas. The image change detection circuit 20 may include the present integration register for storing m integrated values and the preceding integration register for storing m×n integrated values. After the integration circuit 30 has stored the integrated values of the second image for n areas in the horizontal direction in the present integration register 50, the change detection signal generation circuit 40 may compare the integrated value stored in the present integration register 50 with the corresponding integrated value stored in the preceding integration register 60 in which the integrated value of the image data of the first image is stored to detect the presence or absence of change, and transfer the integrated value stored in the present integration register to the preceding integration register after the comparison.

Figure 2:
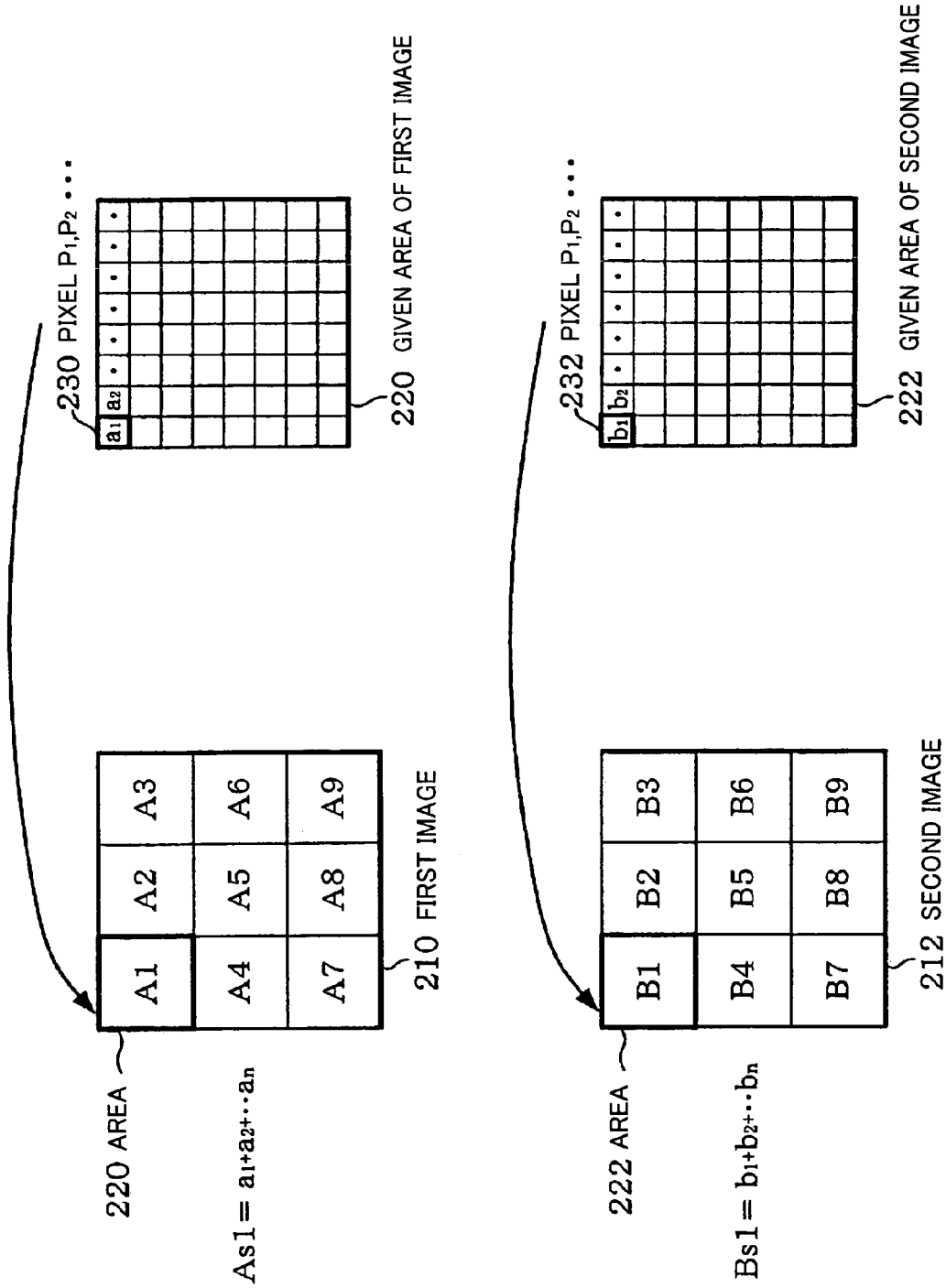
FIG. 2 is a diagram illustrative of pixel value integration in area units in one embodiment of the invention.

FIG. 2 is a diagram illustrative of pixel value integration in area units in the embodiment.

Reference numerals 210 and 212 indicate the first image and the second image input in time series. In the embodiment, the first image 210 and the second image 212 are divided into a plurality of areas in the same division pattern. In FIG. 2, each image is divided into nine (=3×3) areas by equally dividing the image into three areas in the horizontal direction and equally dividing the image into three areas in the vertical direction.

For example, a given area 220 of the first image is made up of n (=m1×m2, m1 and m2 are natural numbers) pixels P1, P2, . . . , Pn, and the pixel values of the pixels P1, P2, . . . , Pn are respectively a1, a2, . . . , an. The pixel values a1, a2, . . . , an may be the values of one component of the YUV components or the RGB components, for example.

In this case, if the integrated value of the pixel values of an area A1 of the first image is As1, the integrated value As1 may be expressed by the following equation, for example.

$$As1 = a1 + a2 + \ldots + an$$

An integrated value Ad1' may be calculated by integrating values a1', a2', . . . , an' of higher-order bits of the pixel values a1, a2, . . . , an.

Likewise, a given area 222 of the second image is made up of n (=m1×m2, m1 and m2 are natural numbers) pixels P1, P2, . . . , Pn, and the pixel values of the pixels P1, P2, . . . , Pn are respectively b1, b2, . . . , bn, for example. The pixel values b1, b2, . . . , bn may be the values of one component of the YUV components or the RGB components (provided that the component is the same as that of the pixel values a1, a2, . . . , an).

In this case, if the integrated value of the pixel values of an area B1 of the second image is Bs1, the integrated value Bs1 may be expressed by the following equation, for example.

$$Bs1 = b1 + b2 + \ldots + bn$$

An integrated value Bs1' may be calculated by integrating values b1', b2', . . . , bn' of higher-order bits of the pixel values b1, b2, . . . , bn.

In the embodiment, the integrated values (e.g. As1 and Bs1) are compared in area units to detect the presence or absence of change. A condition relating to the reference change rate used as the reference when detecting a change may be set in the reference change rate setting register, and the integrated values of corresponding areas of the first image and the second image stored in the integration registers may be compared based on the reference change rate to detect the presence or absence of change. The reference change rate may be set by the ratio of change with respect to the entire area or the like. For example, when the reference change rate is set at h%, it is determined that a change has occurred (change is detected) when the value "(Bs1−As1)/As1" (change rate) is equal to or greater than h%. When the reference change rate h1 is smaller than the reference change rate h2, the change detection sensitivity is increased by employing the reference change rate h1 rather than the reference change rate h2. Therefore, it is preferable to set the reference change rate depending on the application of the security camera or the like, the imaging location conditions, and the like.

For example, a plurality of reference change rates (e.g. first reference change rate: 3 to 6%, second reference change rate: 3%, and third reference change rate: 25%) may be provided, and one of the reference change rates may be selectively set.

Nine integration registers may be provided for storing the integrated values As1 to As9 of the areas A1 to A9 of the first image, and nine integration registers may be provided for storing the integrated values Bs1 to Bs9 of the areas B1 to B9 of the second image.

The integration target values may be higher-order bits of each pixel value, for example. For example, five higher-order bits of the pixel values may be integrated so that the integration register has a 24-bit configuration. The hardware scale can be reduced by using higher-order bits of each pixel value as the integration target values.

Figure 3:
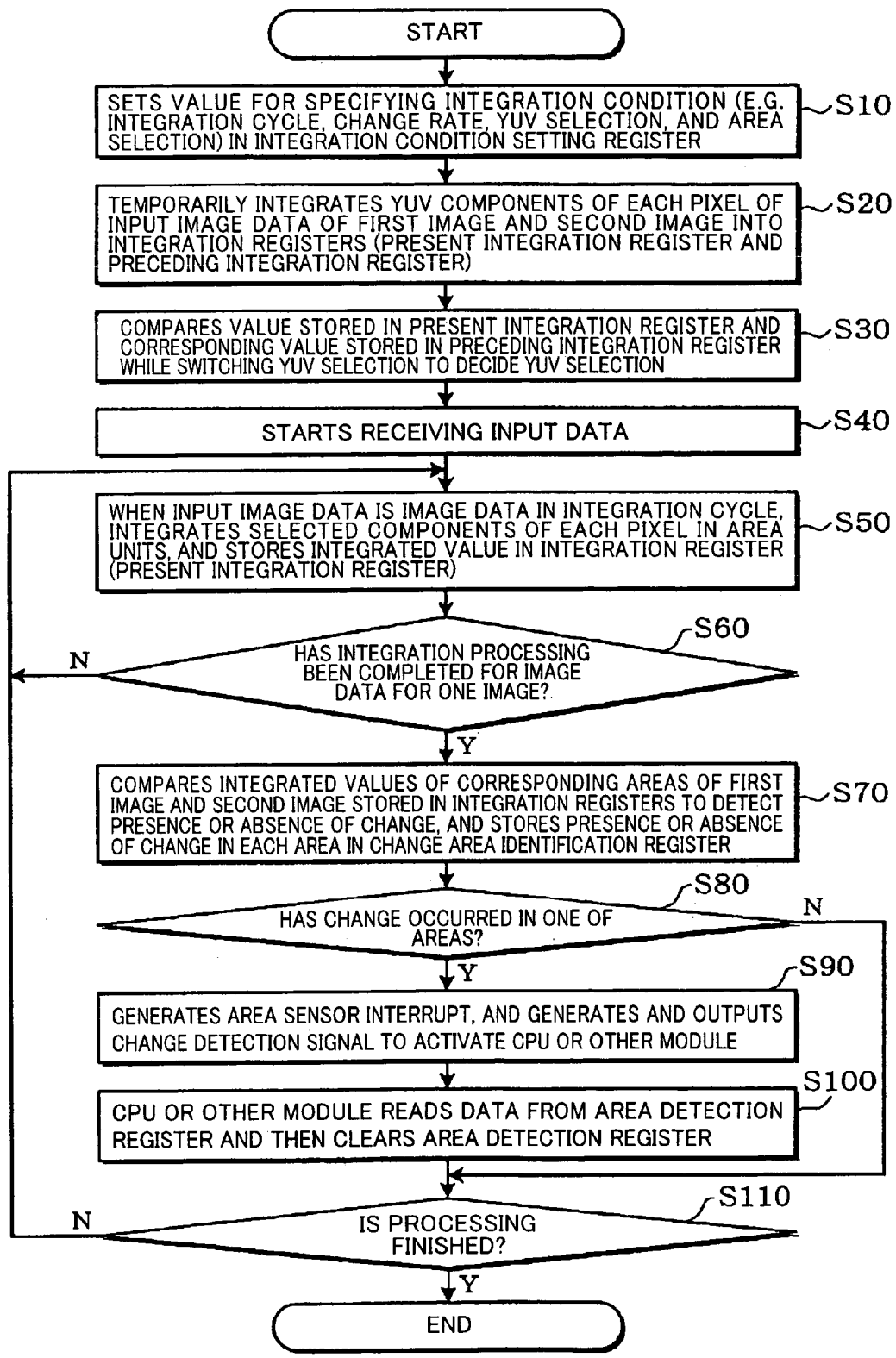
FIG. 3 is a flowchart illustrative of an example of image change detection processing in one embodiment of the invention.

FIG. 3 is a flowchart illustrative of an example of image change detection processing in the embodiment.

A value for specifying the integration condition (e.g. integration cycle, change rate, YUV selection, and area selection) is set in the integration condition setting register (step S10).

The YUV components of each pixel of the input image data of the first image and the second image are temporarily integrated and stored in the integration registers (present integration register and preceding integration register) (step S20).

The value stored in the present integration register and the corresponding value stored in the preceding integration register are compared while switching the YUV selection to select the component having a higher dynamic range (step S30).

The input data then starts to be received (step S40).

Whether or not the input image data is the image data in the integration cycle is determined. When the input image data is the image data in the integration cycle, the selected component (may be higher-order bits) of each pixel is integrated in area units, and the integrated value is stored in the integration register (present integration register) (step S50).

Whether or not the integration processing has been completed for the image data for one image is determined (step S60). When the integration processing has not been completed, the processing in the step S50 is performed again. When the integration processing has been completed, the following processing is performed.

The integrated values of corresponding areas of the first image and the second image stored in the integration registers are compared to detect the presence or absence of change, and the evidence of the presence or absence of change in each area is stored in the change area identification register (step S70).

When a change has occurred in one of the areas (step S80), an area sensor interrupt is generated, and the change detection signal is generated and output to activate the CPU or another module (step S90).

The CPU or another module reads data set in an area detection register, and clears the area detection register (step S100).

If the processing is not finished, the processing in the step S50 is performed again (step S110).

Figure 4A:
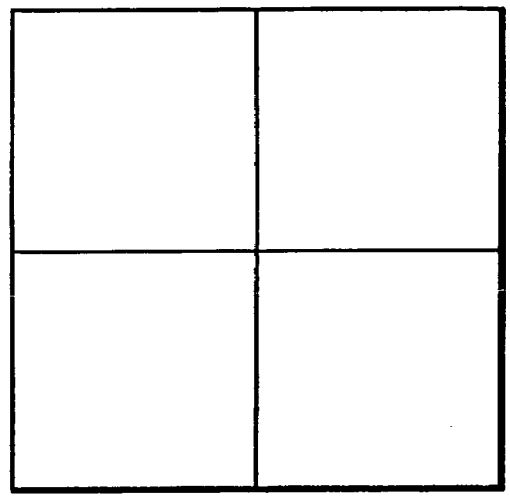
FIGS. 4A to 4C are diagrams illustrative of image area division patterns in one embodiment of the invention.
Figure 4B:
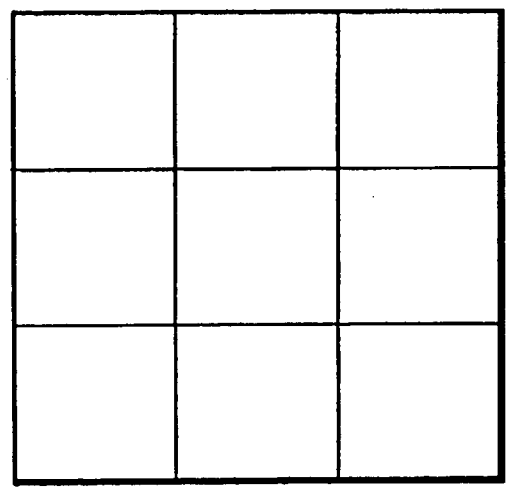
Figure 4C:
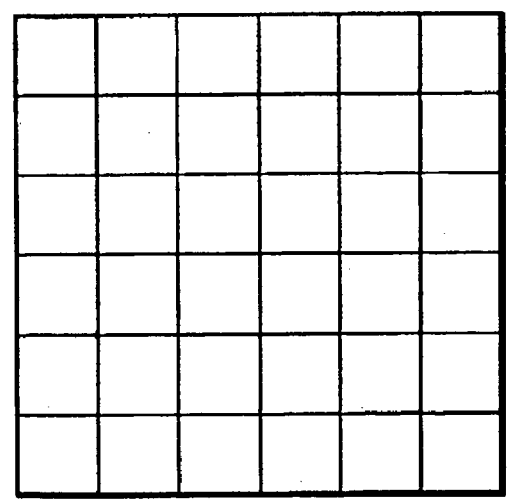

FIGS. 4A to 4C are diagrams illustrative of image area division patterns in the embodiment.

FIG. 4A shows a first division pattern in which the image is divided into four areas (rectangular (large) areas) by dividing the image into two areas in the horizontal direction and dividing the image into two areas in the vertical direction. FIG. 4B shows a second division pattern in which the image is divided into nine areas (rectangular (medium) areas) by dividing the image into three areas in the horizontal direction and dividing the image into three areas in the vertical direction. FIG. 4C shows a third division pattern in which the image is divided into 36 areas (rectangular (small) areas) by dividing the image into six areas in the horizontal direction and dividing the image into six areas in the vertical direction.

The division pattern may be set and changed by external input.

When checking whether or not the image has been changed by detecting a change in the integrated value of each area, a change can be more accurately detected by dividing the image into smaller areas. Specifically, a change can be accurately detected in the order from the third division pattern, the second division pattern, and the first division pattern.

The change detection sensitivity can be changed by changing the number of area divisions (changing the size of each area). For example, the change detection sensitivity can be increased by increasing the number of area divisions (reducing the size of each area).

However, since the circuit scale is increased as the image is divided into smaller areas, it is preferable to set the number of area divisions depending on the objective of the security camera or the like, the installation conditions, and the like.

Figure 5A:
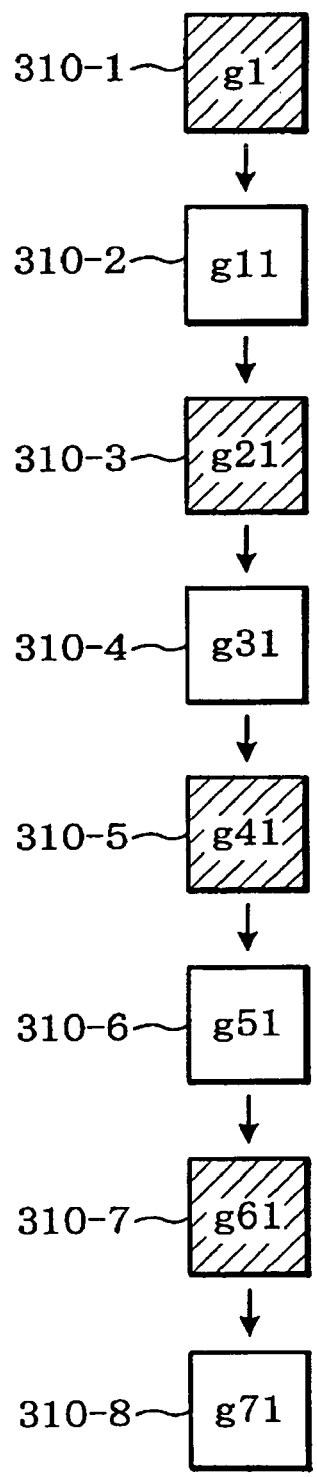
FIGS. 5A and 5B are diagrams illustrative of an integration cycle in one embodiment of the invention.
Figure 5B:

FIGS. 5A and 5B are diagrams illustrative of the integration cycle in the embodiment.

FIG. 5A shows integration target images when the integration cycle is 1/20 sec. Reference numerals 310-1, 310-2, ... indicate time-series images g1, g11, ... sent from the imaging means such as the security camera. The image g1 is an image in the first frame, the image g11 is an image in the eleventh frame, and the image gn is an image in the nth frame. In the case where images are taken in units of 1/60 sec, the images are subjected to integration at intervals of 20 frames when the integration cycle is 1/20 sec. In FIG. 5A, the image g1 (310-1), the image g21 (310-3), ... become the integration-comparison targets, and the remaining images received between these images are excluded from the integration-comparison targets.

FIG. 5B shows integration target images when the integration cycle is 1/60 sec. The reference numerals 310-1, 310-2, ... indicate the time-series images g1, g11, ... sent from the imaging means such as the security camera. The image g1 is an image in the first frame, the image g11 is an image in the eleventh frame, and the images gn is an image in the nth frame. In the case where images are taken in units of 1/60 sec, the images are subjected to integration at intervals of 60 frames when the integration cycle is 1/60 sec. In FIG. 5B, the image g1 (310-1), the image g61 (310-3), ... become the integration-comparison targets, and the remaining images received between these images are excluded from the integration-comparison targets.

According to this embodiment, the change detection image pick-up cycle can be changed by changing the value set in the integration cycle setting register. A quick change can be detected by reducing the integration cycle, and a slow change can be detected by increasing the integration cycle. Therefore, it is preferable to adjust the area division setting depending on the objective.

Figure 6A:
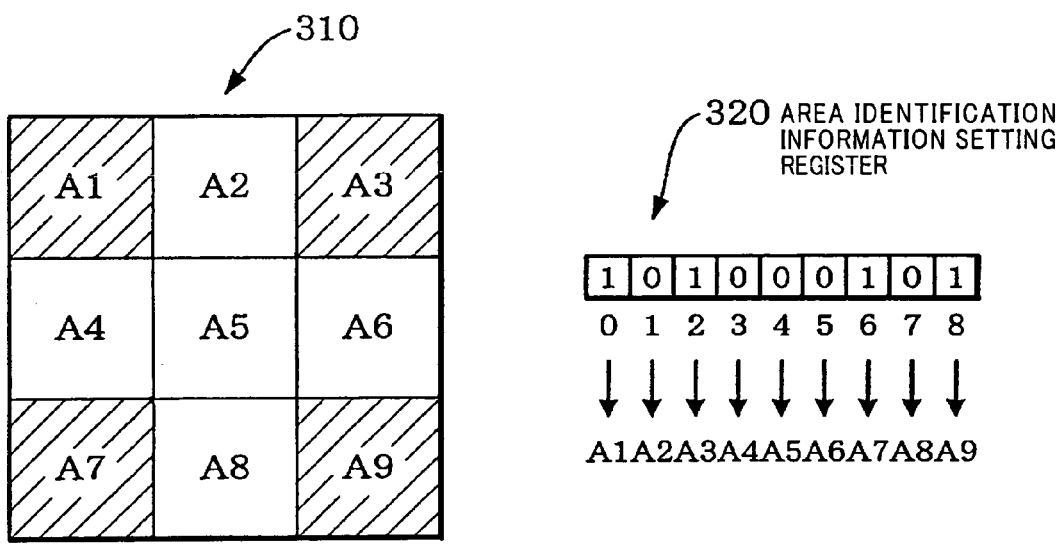
FIGS. 6A and 6B are diagrams illustrative of change detection target areas.
Figure 6B:
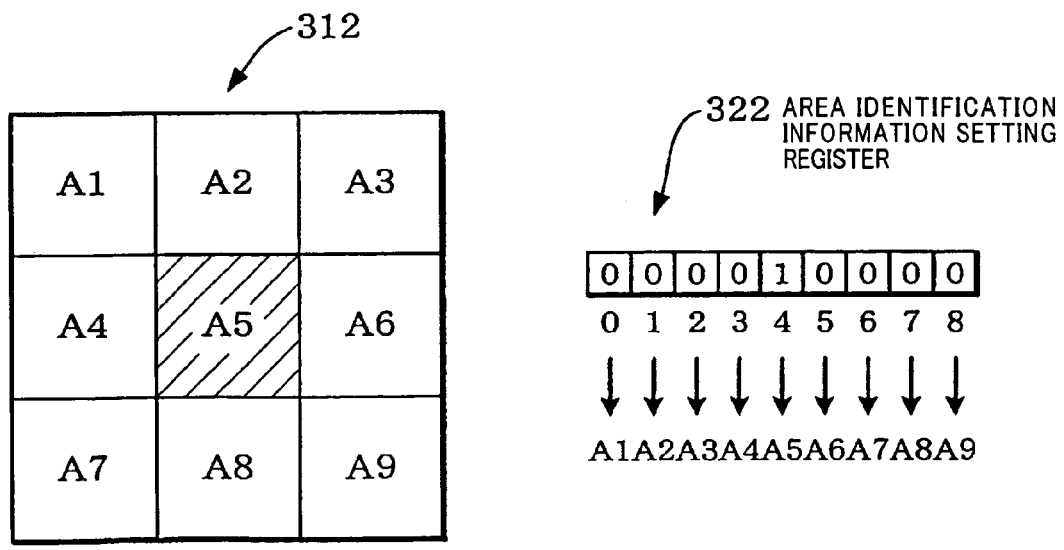

FIGS. 6A and 6B are diagrams illustrative of change detection target areas.

A reference numeral 320 in FIG. 6A indicates that the image is divided into nine areas A1 to A9 and the areas A1, A3, A7, and A9 are set as the change detection targets. The reference numeral 320 indicates the contents of the area identification information setting register. The area identification information setting register having at least nine bits is provided when the image is divided into nine. Each bit of the area identification information setting register is associated with each area (bits 0 to 8 of the area identification information setting register respectively correspond to the areas A1 to A9 in FIG. 6A), and whether or not the corresponding area is the detection target is set by setting each bit to ON or OFF.

In FIG. 6A, since the areas A1, A3, A7, and A9 are set as the change detection targets, the corresponding bits 0, 2, 6, and 8 of the area identification information setting register are set at "1", and the remaining bits are set at "0".

According to this configuration, the CPU or the like can be notified of occurrence of change by generating an interrupt or the like only when a change has occurred in the areas A1, A3, A7, and A9 as the change detection targets.

For example, a change occurring in the areas A2, A4, A5, A6, and A8 can be masked when it is unnecessary to detect a change since a change always occurs in the areas A2, A4, A5, A6, and A8.

A reference numeral 322 in FIG. 6B indicates that the image is divided into nine areas A1 to A9 and the area A5 is set as the change detection target. The reference numeral 322 indicates the contents of the area identification information setting register.

In FIG. 6B, since the area A5 is set as the change detection target, the corresponding bit 4 of the area identification information setting register is set at "1", and the remaining bits are set at "0".

According to this configuration, the CPU or the like can be notified of occurrence of change by generating an interrupt or the like only when a change has occurred in the area A5 as the change detection target.

For example, when a door, window, or the like exists in the area A5 and it suffices to detect only a change occurring near the door or window, a change occurring in the areas other than the area A1 can be masked.

According to this embodiment, the CPU or the like can be notified of occurrence of change only when a change has occurred in the detection target area. There may be a case where it is unnecessary to detect a change occurring in a certain area depending on the imaging conditions since the image is always changed in this area. According to this embodiment, since the change detection of such an area can be masked, it is possible to efficiently detect a change occurring in a particular area.

Figure 7A:
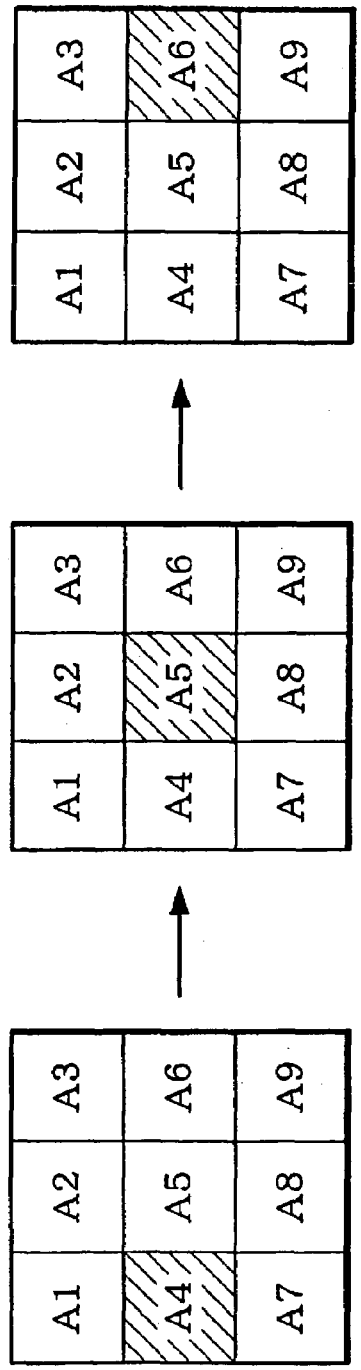
FIGS. 7A and 7B are diagrams illustrative of position detection in one embodiment of the invention.
Figure 7B:
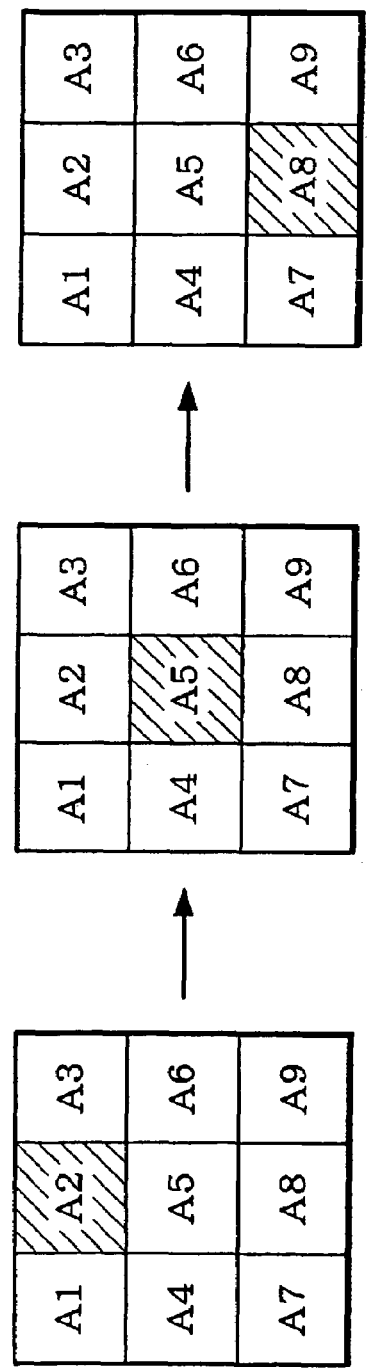

FIGS. 7A and 7B are diagrams illustrative of position detection in the embodiment.

FIG. 7A shows a state in which the image is divided into nine areas A1 to A9 and the area, in which a change has been detected, changes in the order of A4→A5→A6. In this case, it is estimated that something has moved from the left to the right near the center of the image.

FIG. 7B shows a state in which the image is divided into nine areas A1 to A9 and the area, in which a change has been detected, changes in the order of A2→A5→A8. In this case, it is estimated that something has moved from the top to the bottom near the center of the image.

According to this embodiment, since the change moving direction can be determined by reading the areas in which a change has been detected in time series, simple movement detection can also be performed.

Figure 8:
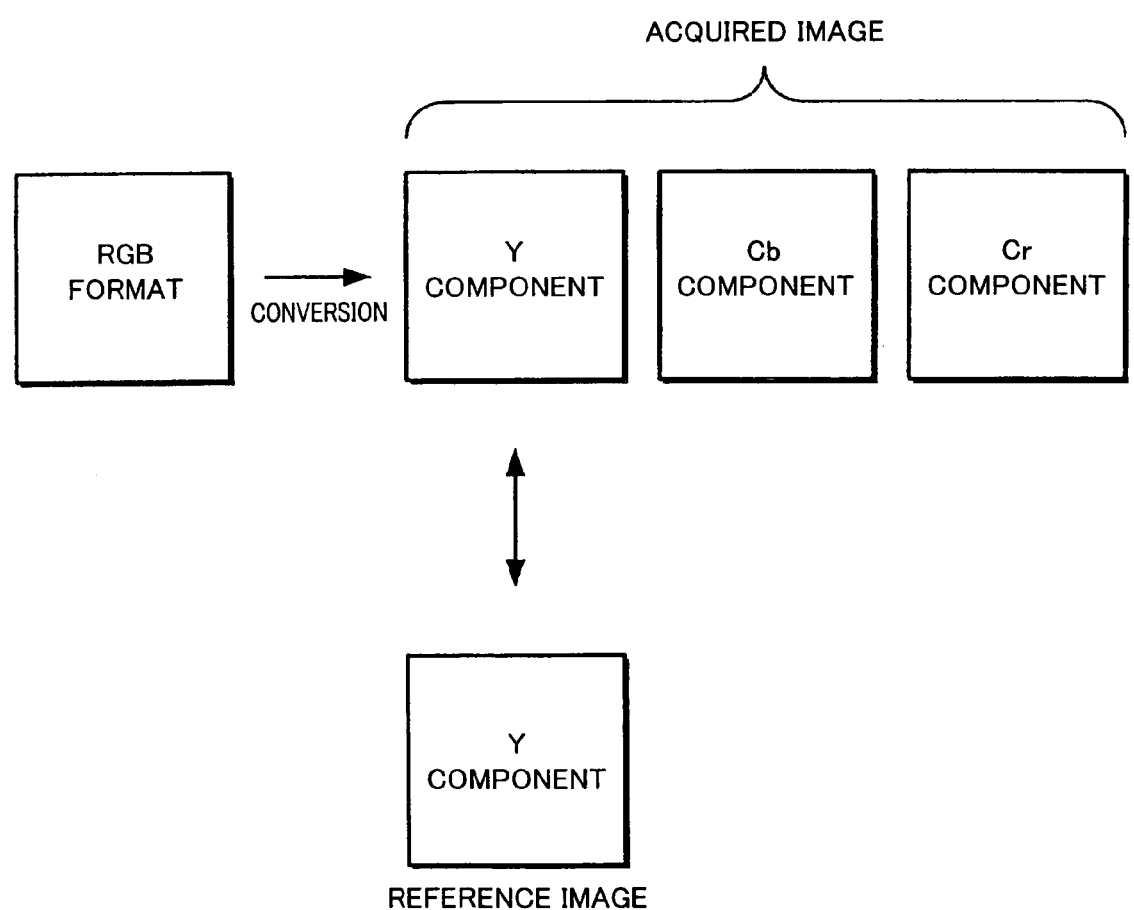
FIG. 8 is a diagram illustrative of a pixel value used in one embodiment of the invention.

FIG. 8 is a diagram illustrative of the pixel value used in the embodiment.

When using the YUV data as the pixel value information on the pixel, the Y component data of each pixel may be utilized.

The following description is given on the assumption that the image data received from the imaging means is in the RGB format. However, the invention is not limited thereto. In the image data in the RGB format, each pixel is expressed by RGB primary color signals.

The acquired image data in the RGB format is converted into image data made up of the Y component (luminance component), the Cb component, and the Cr component. The image change detection section performs the change detection processing by integrating the Y components of the acquired image data.

A reduction in the amount of data and a reduction in the processing load can be achieved by extracting only the luminance component and performing the change detection processing based on the luminance component.

Figure 9:
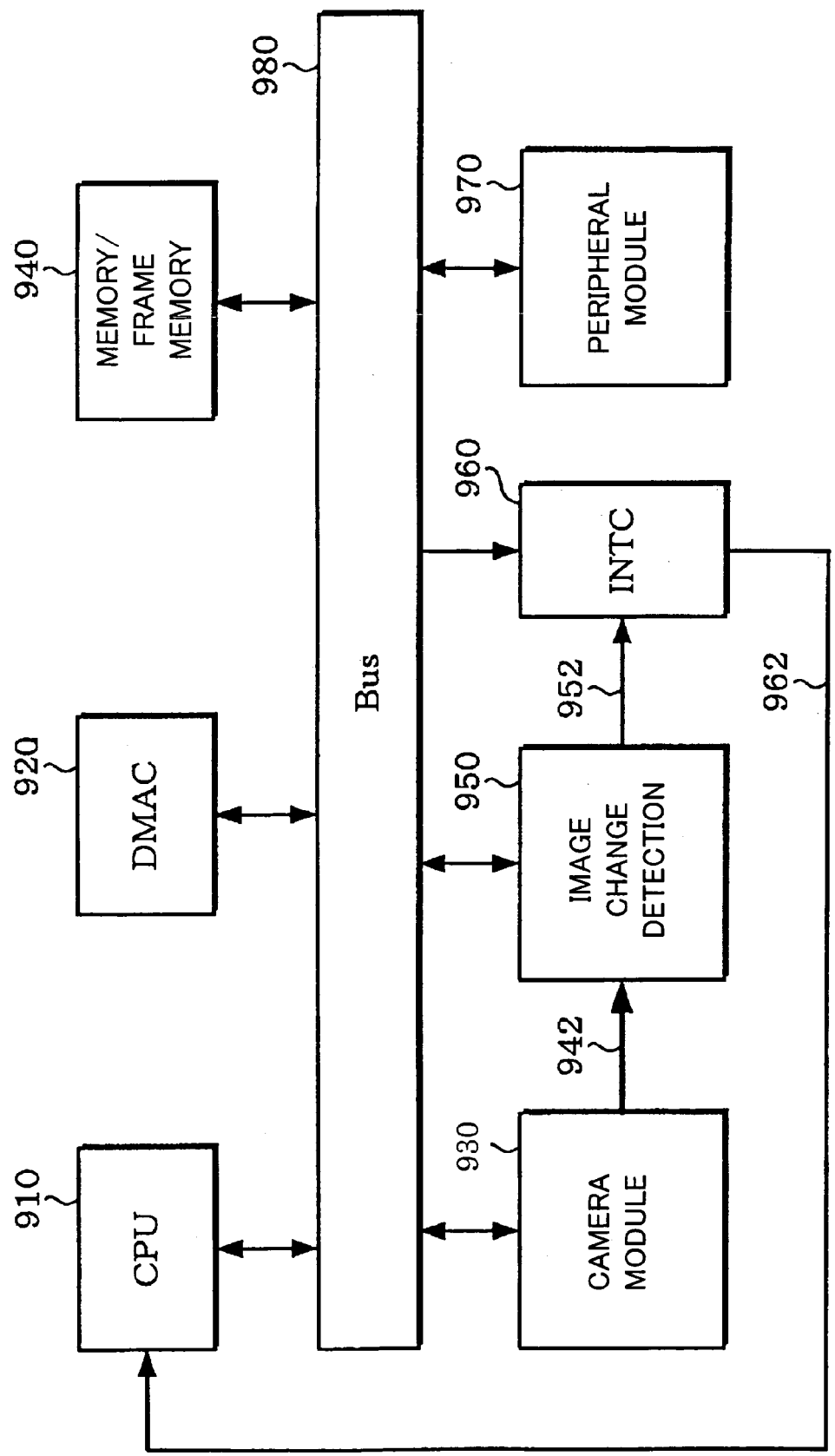
FIG. 9 is a diagram illustrative of a hardware configuration which can realize one embodiment of the invention.

FIG. 9 is a diagram illustrative of a hardware configuration which can realize the embodiment.

An image processing device according to this embodiment includes a CPU 910, a direct memory access controller (DMAC) 920, a camera module 930, a memory (e.g. frame memory) 940, an image change detection circuit 950, an interrupt controller (INTC) 960, a peripheral module (e.g. peripheral module necessary for the system) 970, and the like. These sections are connected through a bus 980.

The image change detection circuit 950 is realized by hardware using a dedicated circuit.

Image data of an image periodically taken by the camera module is input to the image change detection circuit 950 by the DMAC 920 or the like through the bus 980 or a dedicated bus 942.

When the image change detection circuit 950 has detected a change in the image, the image change detection circuit 950 may output a change detection interrupt signal 952 to the interrupt controller (INTC) 960, and the interrupt controller (INTC) 960 may notify the CPU 910 of the detection of change by outputting an interrupt signal to the CPU 910.

In the embodiment, since the image change detection circuit 950 can receive the image data from the imaging means (camera module) 940 in real time and detect occurrence of change, it suffices that the memory capacity and the memory load be small in comparison with the case where the image data is stored in the frame buffer 940 or the like and the CPU 910 or a PC reads the image data from the frame buffer 940 and performs the change detection processing. Moreover, power consumption can be reduced.

According to this embodiment, only a camera sensor and an area sensor can be operated by the security camera or the like, and the CPU can perform a necessary operation in response to an interrupt generated after change detection. Therefore, since the network section and the JPEG section can be set in a sleep state in the absence of change, power consumption can be reduced.

Moreover, since the image can be stored in the storage only when a change has occurred, it suffices that the storage capacity be minimum.

Figure 10:
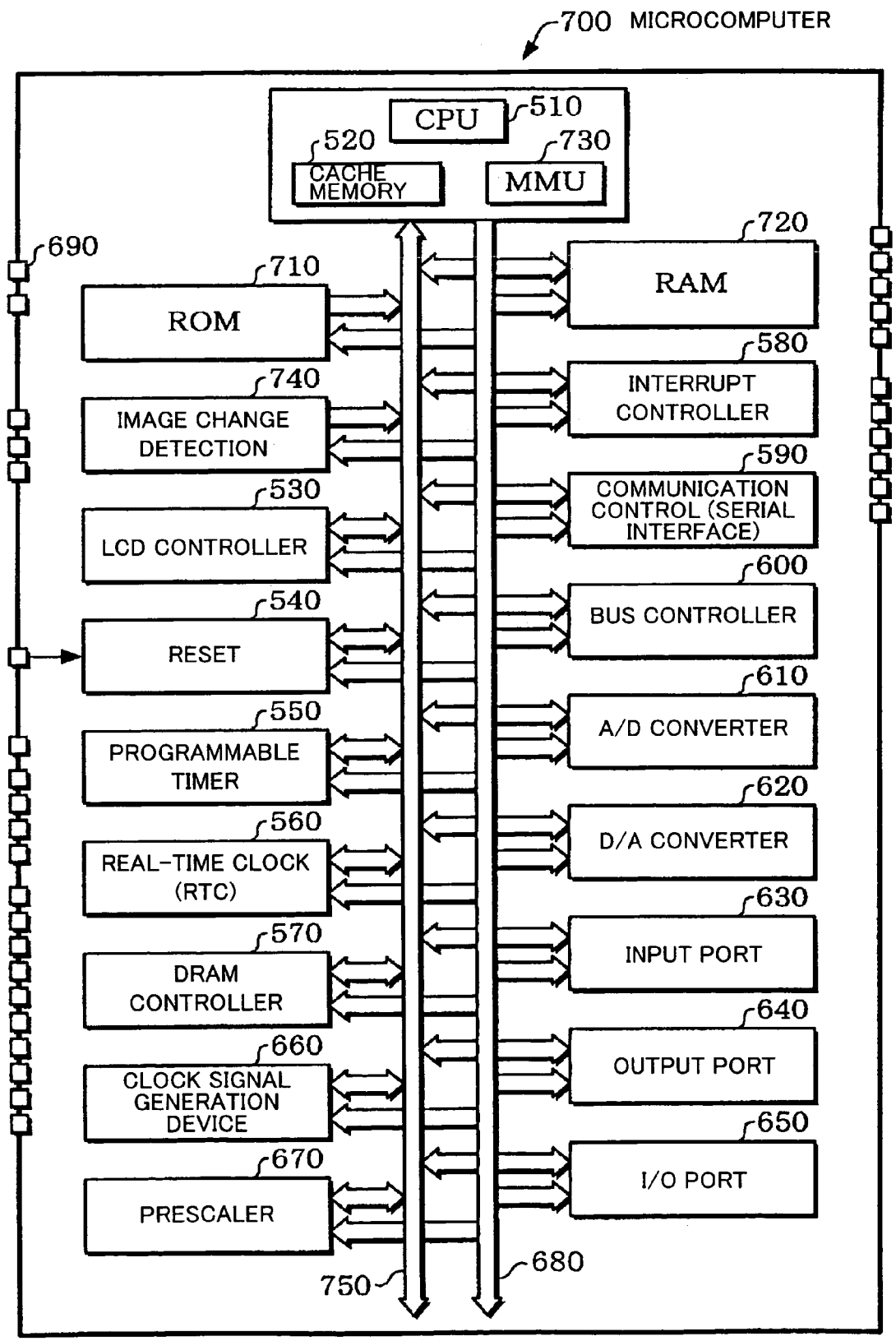
FIG. 10 is a hardware block diagram of a microcomputer according to one embodiment of the invention.

FIG. 10 is a hardware block diagram of a microcomputer according to one embodiment of the invention.

A microcomputer 700 includes a CPU 510, a cache memory 520, a RAM 710, a ROM 720, an MMU 730, an LCD controller 530, a reset circuit 540, a programmable timer 550, a real-time clock (RTC) 560, a DRAM controller 570, an interrupt controller 580, a communication control circuit 590, a bus controller 600, an A/D converter 610, a D/A converter 620, an input port 630, an output port 640, an I/O port 650, a clock signal generation device 660, a prescaler 670, an image change detection circuit 740, a general purpose bus 680 and a dedicated bus 750 which connect these sections, various pins 690, and the like.

The image change detection circuit 740 has a configuration described with reference to FIG. 1, for example.

The invention is not limited to the above-described embodiments, and various modifications can be made within the scope of the invention.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An integrated circuit device comprising:
    an image change detection circuit that receives image data acquired by imaging means in time series, detects a change in the image data, and generates a change detection signal,
    the image change detection circuit including:
        an integration circuit that divides the image into at least one area, integrates pixel values of pixels of the image data of a first image and a second image received in time series, in units of at least one area, and stores a first integrated value of the first image in a first integration register and a second integrated value of the second image in a second integration register; and
        a change detection signal generation circuit that compares the first integration register and the second integration register to detect the presence or absence of change, and generates a change detection signal when the change detection signal generation circuit determines that a change has occurred, and
    the integration circuit receiving a horizontal synchronization signal and a vertical synchronization signal,
    the integration circuit specifying an area of the at least one area to which each pixel belongs based on the horizontal synchronization signal and the vertical synchronization signal, a number of horizontal divisions, and a number of vertical divisions, and
    the integration circuit integrating the pixel values of the specified area of the at least one area.

2. The integrated circuit device as defined in claim 1,
    the integration circuit dividing an image into a plurality of areas, integrating pixel values of pixels of image data of the first image and the second image received in time series in units of the areas, and storing the integrated values in the integration register; and
    the change detection signal generation circuit comparing the integrated values of corresponding areas of the first image and the second image stored in the integration register to detect the presence or absence of change, the change detection signal generation circuit generating the change detection signal when the change detection signal generation circuit determines that a change has occurred.

3. The integrated circuit device as defined in claim 2,
    the image change detection circuit including a change area identification register; and
    the change detection signal generation circuit comparing the integrated values of corresponding areas of the first image and the second image stored in the integration register to detect the presence or absence of change, the change detection signal generation circuit storing evidence of the presence or absence of change in the change area identification register.

4. The integrated circuit device as defined in claim 1,
    the image change detection circuit dividing an image into a plurality of rectangular areas and detecting a change in units of the rectangular areas.

5. The integrated circuit device as defined in claim 4,
    the image change detection circuit including an integration component identification information setting register for setting integration component identification information which is a condition for specifying an integration target component of the pixel value; and
    the integration circuit selecting a pixel component based on a value set in the integration component identification information setting register, and integrating the selected pixel components of the image data.

6. The integrated circuit device as defined in claim 4,
    the integration circuit integrating values of high-order bits of the image data of each pixel value.

7. A microcomputer comprising the integrated circuit device as defined in claim 4.

8. The integrated circuit device as defined in claim 1,
    the image change detection circuit including an integration component identification information setting register for setting integration component identification information which is a condition for specifying an integration target component of the pixel value; and
    the integration circuit selecting a pixel component based on a value set in the integration component identification information setting register, and integrating the selected pixel components of the image data.

9. The integrated circuit device as defined in claim 1,
    the integration circuit integrating values of high-order bits of the image data of each pixel value.

10. The integrated circuit device as defined in claim 1,
    the image change detection circuit dividing an image into n×m areas by dividing the image into m (m is a natural number) areas in a horizontal direction and dividing the image into n (n is a natural number) areas in a vertical direction, the image change detection circuit including m×n present integration registers and m×n preceding integration registers corresponding to the m×n areas; and
    after the integration circuit has stored the integrated value of the image data of the second image received after the image data of the first image in the present integration register, the change detection signal generation circuit comparing the integrated value stored in the present integration register with the corresponding integrated value stored in the preceding integration register in which the integrated values of the image data of the first image is stored to detect the presence or absence of change, the change detection signal generation circuit transferring the integrated value stored in the present integration register to the preceding integration register after the comparison.

11. The integrated circuit device as defined in claim 1,
    the image change detection circuit dividing an image into n×m areas by dividing the image into m (m is a natural number) areas in a horizontal direction and dividing the image into n (n is a natural number) areas in a vertical direction, the image change detection circuit including m present integration registers corresponding to the m areas in the horizontal direction and m×n preceding integration registers corresponding to the n×m areas; and
    after the integration circuit has stored the integrated values of the second image for the n areas in the horizontal direction received after the image data of the first image in the present integration registers, the change detection signal generation circuit comparing the integrated value stored in the present integration register with the corresponding integrated value stored in the preceding integration register in which the integrated values of the image data of the first image is stored to detect the presence or absence of change, the change detection signal generation circuit transferring the integrated value stored in the present integration register to the preceding integration register after the comparison.

12. A microcomputer comprising the integrated circuit device as defined in claim 1.

13. An integrated circuit device comprising:
an image change detection circuit that receives image data acquired by imaging means in time series, detects a change in the image data, and generates a change detection signal,
the image change detection circuit including:
an integration circuit that divides the image into at least one area, integrates pixel values of pixels of the image data of a first image and a second image received in time series, in units of the at least one area, and stores a first integrated value of the first image in a first integration register and a second integrated value of the second image in a second integration register;
a change detection signal generation circuit that compares the first integration register and the second integration register to detect the presence or absence of change, and generates the change detection signal when the change detection signal generation circuit determines that a change has occurred, and
an integration cycle setting register for setting a condition relating to an integration cycle;
the integration circuit specifying an integration cycle based on a value set in the integration cycle setting register, determining whether or not the received image data coincides with the specified integration cycle, and storing the integrated value in the integration register.

14. An integrated circuit device comprising:
an image change detection circuit that receives image data acquired by imaging means in time series, detects a change in the image data, and generates a change detection signal,
the image change detection circuit including:
an integration circuit that divides the image into at least one area, integrates pixel values of pixels of the image data of a first image and a second image received in time series, in units of the at least one area, and stores a first integrated value of the first image in a first integration register and a second integrated value of the second image in a second integration register;
a change detection signal generation circuit that compares the first integration register and the second integration register to detect the presence or absence of change, and generates a change detection signal when the change detection signal generation circuit determines that a change has occurred, and
a reference change rate setting register for setting a condition relating to a reference change rate used as a reference when detecting a change;
the change detection signal generation circuit specifying the reference change rate based on a value set in the reference change rate setting register, comparing integrated values of corresponding areas of the first image and the second image stored in the integration register, and detecting the presence or absence of change based on the reference change rate.

15. An integrated circuit device comprising;
an image change detection circuit that receives image data acquired by imaging means in time series, detects a change in the image data, and generates a change detection signal,
the image change detection circuit including:
an integration circuit that divides the image into at least one area, integrates pixel values of pixels of the image data of a first image and a second image received in time series, in units of the at least one area, and stores a first integrated value of the first image in a first integration register and a second integrated value of the second image in a second integration register;
a change detection signal generation circuit that compares the first integration register and the second integration register to detect the presence or absence of change, and generates a change detection signal when the change detection signal generation circuit determines that a change has occurred, and
an area identification information setting register for setting area identification information that is a condition for specifying a change detection target area;
the change detection signal generation circuit determining whether or not an area is the detection target area based on a value set in the area identification information setting register, and omitting generation of the change detection signal when the area is not the detection target area.

* * * * *